(12) United States Patent
Anspach et al.

(10) Patent No.: US 9,358,754 B2
(45) Date of Patent: Jun. 7, 2016

(54) DIMENSIONALLY STABLE PRODUCT AND PROCESS OF FABRICATING A DIMENSIONALLY STABLE PRODUCT

(75) Inventors: Kean M. Anspach, Quarryville, PA (US); Brent L. Stoll, Lititz, PA (US); John R. Eshbach, Marietta, PA (US); Thomas P. Greenawalt, Lancaster, PA (US); Brian E. Speizer, Lancaster, PA (US)

(73) Assignee: AFI Licensing LLC, Lancasster, PA (US)

( * ) Notice: Subject to any disclaimer, the term of this patent is extended or adjusted under 35 U.S.C. 154(b) by 1310 days.

(21) Appl. No.: 13/225,777

(22) Filed: Sep. 6, 2011

(65) Prior Publication Data

US 2013/0059136 A1 Mar. 7, 2013

(51) Int. Cl.
| | | |
|---|---|---|
| *B32B 27/30* | (2006.01) | |
| *B32B 7/02* | (2006.01) | |
| *B32B 27/18* | (2006.01) | |
| *B32B 5/02* | (2006.01) | |
| *B32B 7/04* | (2006.01) | |
| *B32B 27/12* | (2006.01) | |
| *B32B 37/00* | (2006.01) | |
| *B32B 37/04* | (2006.01) | |
| *B32B 37/20* | (2006.01) | |

(52) U.S. Cl.
CPC . *B32B 5/022* (2013.01); *B32B 7/02* (2013.01); *B32B 7/04* (2013.01); *B32B 27/12* (2013.01); *B32B 27/30* (2013.01); *B32B 27/304* (2013.01); *B32B 37/0007* (2013.01); *B32B 37/04* (2013.01); *B32B 37/203* (2013.01); *B32B 2255/02* (2013.01); *B32B 2255/26* (2013.01); *B32B 2272/00* (2013.01); *B32B 2305/20* (2013.01); *B32B 2305/70* (2013.01); *B32B 2307/102* (2013.01); *B32B 2307/554* (2013.01); *B32B 2307/7265* (2013.01); *B32B 2307/734* (2013.01); *B32B 2307/75* (2013.01); *B32B 2309/02* (2013.01); *B32B 2309/10* (2013.01); *B32B 2309/105* (2013.01); *B32B 2419/04* (2013.01); *B32B 2471/00* (2013.01); *Y10T 156/10* (2015.01); *Y10T 428/24942* (2015.01)

(58) Field of Classification Search
USPC .............. 428/212, 220; 156/60; 524/502
See application file for complete search history.

(56) References Cited

U.S. PATENT DOCUMENTS

| | | | |
|---|---|---|---|
| RE34,357 E | * | 8/1993 | Eckert et al. .................... 428/47 |
| 6,933,043 B1 | * | 8/2005 | Son ......................... B32B 27/08 428/213 |

* cited by examiner

Primary Examiner — Tahseen N Khan

(57) ABSTRACT

Disclosed is a product, a melt-processed layer, a flexible layer and a process of fabricating the product. The product includes a first layer and a second layer heat-adhered to the first layer. The first layer is a melt-processed layer, the second layer has greater flexibility than the first layer, and the product has dimensional stability. The process includes heat-adhering the first layer to the second layer.

14 Claims, 2 Drawing Sheets

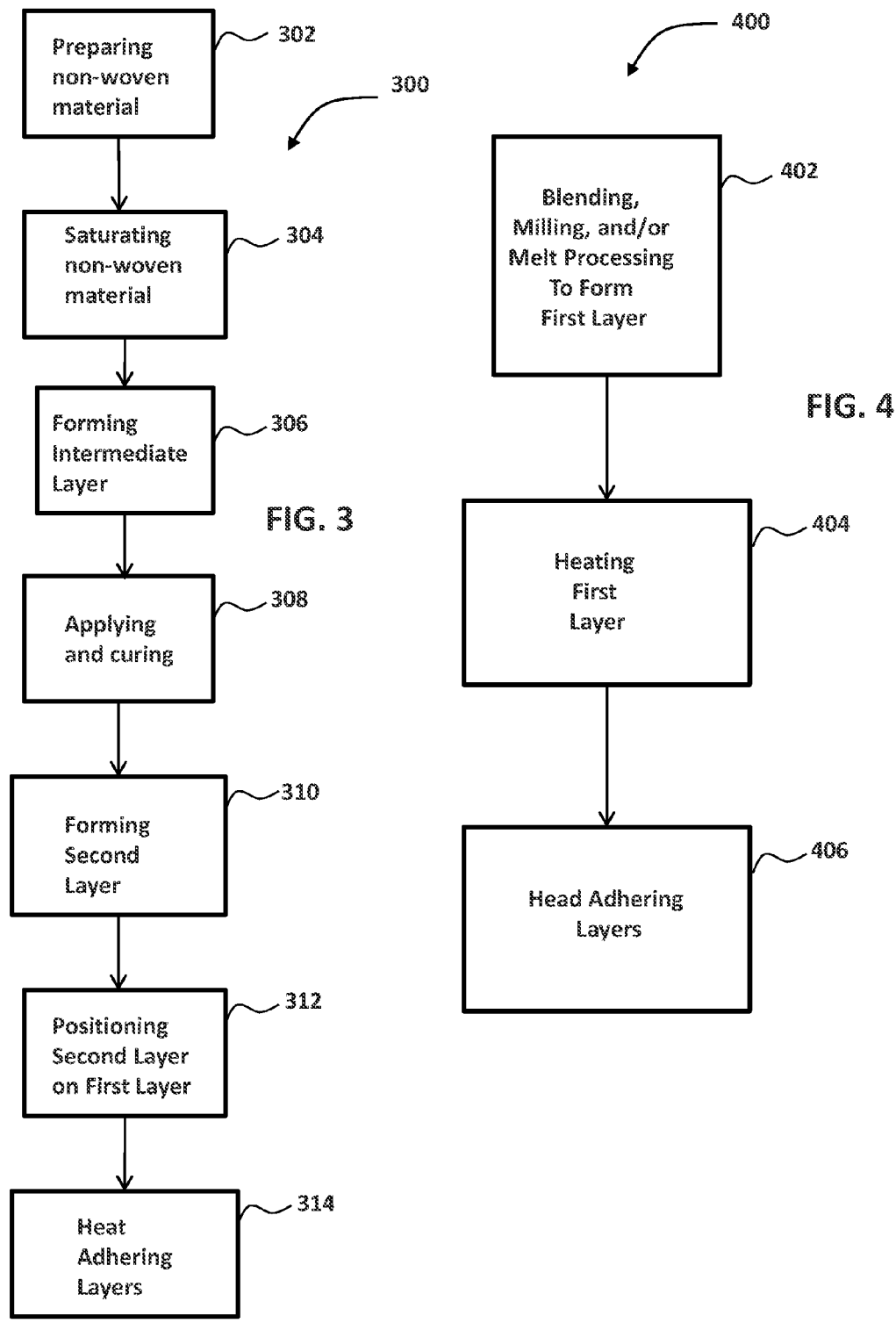

DIMENSIONALLY STABLE PRODUCT AND PROCESS OF FABRICATING A DIMENSIONALLY STABLE PRODUCT

FIELD OF THE INVENTION

The present invention relates to dual layer products, and processes for fabricating dual layer products. More specifically, the present invention relates to heat-adhered dimensionally stable products and processes of fabricating such products.

BACKGROUND OF THE INVENTION

Laminated products, such as vinyl flooring laminate, are used in various facilities and applications where dimensional stability or buckling resistance are desired. Laminated products are also used in ceilings, walls, table-tops, counter-tops, cabinets, or other suitable applications.

Some vinyl laminated products suffer from a drawback of being rough, having inconsistent surfaces, and/or being further misaligned over time. For example, some laminated products are further misaligned though dimensional instability between layers of the laminated products. In these products, when one or more than one layer is subjected to extreme temperatures, the expansion and/or contraction of such layers results in relative movement of the layers or portions of the layers. Such relative movement can result in delamination, separation of the layers, bubbles, buckling, cracking, curling, other undesirable consequences, or combinations thereof. In one known product, such dimensional instability results in end gap openings of flooring of up to between about 48 mils and about 96 mils on a four foot plank.

Glass sheet products have better dimensional stability than known vinyl laminated products. However, glass sheet products are too flexible for certain applications, may undesirably buckle, may be undesirably semi-translucent or semi-transparent (for example, when married to a rigid dark colored backing), may not bridge subfloor irregularities, and/or may lack desired adhesion between separate layers.

Such drawbacks of vinyl laminated products and glass sheet products can be intensified when flexible layers are adhered to rigid products.

A dimensionally stable product having a flexible layer adhered to a rigid layer, and a process of fabricating such a product that do not suffer from one or more of the above drawbacks would be desirable in the art.

BRIEF DESCRIPTION OF THE INVENTION

According to an embodiment, a product includes a first layer, and a second layer heat-adhered to the first layer. The first layer is a melt-processed layer, the second layer has greater flexibility than the first layer, and the product has dimensional stability.

According to another embodiment, a melt-processed layer includes at least 4%, by weight, plasticizer and a binder, the binder being at a concentration, by weight, of less than about 17.5%.

According to another embodiment, a flexible layer includes a non-woven material. The non-woven material includes one or both of glass and polyester, and the flexible layer has a thickness of less than 60 mils.

According to another embodiment, a process includes heat-adhering a first layer to a second layer, the first layer having greater flexibility than the second layer and the product having dimensional stability.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a flow chart of an exemplary process of forming a flexible layer for a product according to an embodiment of the disclosure.

FIG. 4 is a flow chart of another exemplary process of forming a rigid layer for a product according to an embodiment of the disclosure.

Wherever possible, the same reference numbers will be used throughout the drawings to represent the same parts.

DETAILED DESCRIPTION OF THE INVENTION

Provided is a product, a melt-processed layer, a flexible layer, and a process of fabricating a product. Embodiments of the present disclosure provide dimensional stability, provide resistance to buckling, provide resistance to show-through (for example, of rigid dark colored backing), provide resistance to subfloor irregularities, provide wear resistance, reduce costs (for example, by decreasing the amount of delaminated product), provide visual quality, provide desirable installation characteristics (such as, smooth surfaces), are capable of being used in various types of products (for example, vinyl flooring laminates, installed floating floors, and/or full spread floors), and combinations thereof.

Figure 1:
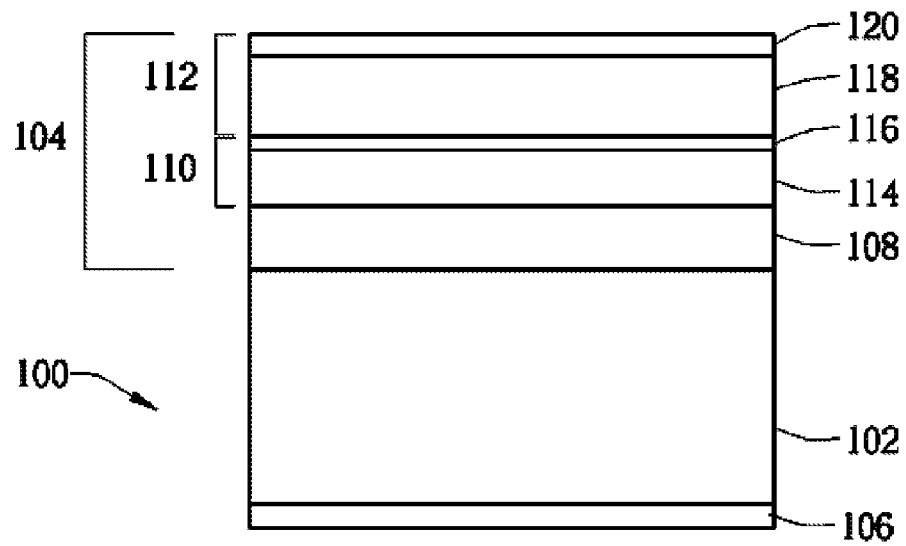
FIG. 1 illustrates an exemplary product having a flexible layer and a rigid layer according to an embodiment of the disclosure.

Referring to FIG. 1, in one embodiment, a product 100 includes a first layer 102 and a second layer 104 heat-adhered to the first layer 102. The heat adherence secures the first layer 102 and the second layer 104 through any suitable mechanism, such as, thermoplastic bonding, diffusion between layers catalyzed by applying heat, reaction of a heat-sensitive material between or at the abutting portion of the layers, any other suitable heat-activated adherence, or combinations thereof. In some embodiments of the disclosure, the first layer 102 and/or the second layer 104 are capable of being used in products (not shown) that are not heat-adhered. Similarly, while some embodiments of the process disclosed herein include the first layer 102 and the second layer 104 being heat-adhered, other embodiments include the first layer 102 and the second layer 104 being fabricated for such other products and/or being secured by additional or alternative mechanisms.

The product 100 includes any suitable features. For example, in one embodiment, the product 100 includes beveled or unbeveled edges that are painted or stained to provide decorative advantages. In one embodiment, the product 100 is offset-laminated to provide a shiplap joint for use in floating floor installations. In one embodiment, the product 100 includes features to provide grip or support for use in floating floor installations. In one embodiment, the product 100 is cut into planks longer than four feet, limited only by print repeat in some cases. In one embodiment, the product 100 is mechanically embossed, including embossed-in-register, prior to cutting.

The second layer 104 has greater flexibility than the first layer 102. Despite the first layer 102 and the second layer 104 having differing degrees of flexibility, the product 100 has dimensional stability. As used herein, the term "dimensional stability" refers to being substantially resistant to separation of layers, either in whole or in part, usually attributable to relative movement of such layers when one or more of the layers are subjected to a temperature above or below the temperature of one or more other layers. For example, in one embodiment, dimensional stability results in the product 100 being substantially resistant to delamination, retaining a substantially planar profile, having resistance to shrinkage in use over time, or combinations thereof. In one embodiment, the product has a predetermined dimensional stability shrinkage (amount of change of length of test piece when temperature tested), for example, between about 0.2% and about 0.3%, between about 0.1% and about 0.3%, between about 0.05% and about 0.3%, between about 0.1% and about 0.2%, between about 0.05% and about 0.1%, between about 0.04% and about 0.06%, less than about 0.3%, less than about 0.2%, less than about 0.1%, less than about 0.06%, less than about 0.05%, or any suitable combination or sub-combination thereof.

In one embodiment, the first layer 102 includes a vinyl composition. Suitable vinyl compositions include, but are not limited to, polyvinylchloride (including copolymers and/or homopolymers), luxury vinyl tile, vinyl compositions of vinyl composition tile, and vinyl compositions of vinyl asbestos tile (or products replacing asbestos). In a further embodiment, the vinyl composition includes one or more plasticizers, one or more stabilizers, one or more binders, one or more fillers, and/or one or more pigments, such as a chloride processing pigment (for example, titanium dioxide). In one embodiment, the first layer 102 includes biobased materials (for example, materials having a carbon signature identifying the materials as being from a non-synthetic source), recycled materials (for example, materials capable of being identified as being from a previously used product), renewable materials (for example, materials capable of being decomposed), or combinations thereof. To increase the flatness and rigidity of the first layer 102, in one embodiment, the vinyl composition includes a predetermined concentration of the plasticizer (for example, a relatively high concentration) and a predetermined concentration of the binder (for example, a relatively low concentration).

The predetermined concentration of the plasticizer in the vinyl composition is, by weight, between about 4% and about 10%, between about 5% and about 7%, between about 5% and about 6%, between about 6% and about 10%, between about 6% and about 7%, between about 8% and about 10%, between about 8% and about 9%, about 9%, about 8%, about 7%, about 6%, about 5%, greater than about 4%, greater than about 5%, greater than about 6%, or any suitable combination or sub-combination thereof. In one embodiment, the plasticizer includes or is a non-phthalate plasticizer.

The predetermined concentration of the binder in the vinyl composition is, by weight, between about 15% and about 18%, between about 15% and about 17.5%, between about 15% and about 17%, between about 15% and about 16%, between about 12% and about 17%, between about 13% and about 17%, at about 17.5%, at about 17%, at about 16%, at about 15%, or any suitable combination or sub-combination thereof. In one embodiment, the binder includes or is any suitable polymeric material.

The first layer 102 is formed by any suitable process. In one embodiment, a portion or all of the vinyl composition of the first layer 102 (for example, the resin(s), the plasticizer(s), and the filler(s)) is blended and mixed, then milled and melt-processed to form the first layer 102. The melt-processing is by calendering, extruding, continuous mixing, molding, milling, other melt-processes, or a combination thereof. In one embodiment, the first layer 102 is additionally passed through two or more rolls to achieve desired properties, such as, thickness.

In one embodiment, the first layer 102 is formed by calendering. In this embodiment, the first layer 102 is formed by forming a precursor (not shown) having a predetermined thickness (for example, between about 85 mils and about 95 mils, between about 85 mils and about 90 mils, between about 90 mils and about 95 mils, or any suitable combination or sub-combination thereof). The precursor is heated to a predetermined temperature (for example, between about 300° F. and about 400° F., between about 330° F. and about 390° F., between about 370° F. and about 390° F., between about 330° F. and about 350° F., or any suitable combination or sub-combination thereof). In one embodiment, the precursor is built up by applying more of the precursor and subsequent heating, for example, to the same temperatures or slightly higher temperatures. The precursor is then processed, for example, by pressure from a calendar, to form the first layer 102. In one embodiment, the first layer 102 includes a predetermined thickness, for example, between about 40 mils and 250 mils, between about 70 mils and 250 mils, about 170 mils and 250 mils, about 70 mils and 150 mils, between about 70 mils and 160 mils, between about 40 mils and 160 mils, at least 70 mils, at least 90 mils, at least 120 mils, at least 150 mils, or any suitable combination or sub-combination thereof.

Referring again to FIG. 1, in one embodiment, the first layer 102 is secured to a bottom layer 106, for example, through lamination and/or by an adhesive. The adhesive is any suitable adhesive, for example, such as a hot melt adhesive, a pressure sensitive acrylic adhesive, or a structural and/or reactive adhesive. In one embodiment, the bottom layer 106 is a rigid black polyvinyl chloride film, but may be formed, for example, from a film or tape comprising plastic, vinyl, polyester, polyolefin, nylon, or combinations thereof. In further embodiments, the bottom layer 106 includes recycled material, such as post industrial or post consumer scrap, is rigid or flexible, is moisture resistant or waterproof, or has any other suitable properties. In one embodiment, the bottom layer 106 has a predetermined thickness, for example, between about 5 mils and about 30 mils, between about 15 mils and about 30 mils, between about 25 mils and about 30 mils, at least 5 mils, at least about 10 mils, at least about 15 mils, at least about 25 mils, or any suitable combination or sub-combination thereof.

In one embodiment, the bottom layer 106 includes multiple layers, such as two layers of film laminated with a mat, such as a glass mat or polyethylene terephthalate mat. Additionally or alternatively, in one embodiment, the bottom layer 106 includes a continuous or discontinuous ink, antimicrobial properties, sound-dampening properties, cushioning properties, slide resistant properties, stiffening properties, channeling properties, mechanically embossed texture, chemical texture, or combinations thereof. Similarly, in one embodiment, the first layer 102 includes such features and/or printed or textured portions on either surface of the first layer 102.

The second layer 104 has a predetermined thickness and is secured to the first layer 102. For example, in one embodiment, the predetermined thickness is between about 14 mils and about 60 mils, between about 20 mils and about 40 mils, less than about 60 mils, less than about 50 mils, less than about 40 mils, less than about 30 mils, less than about 25 mils, less than about 20 mils, or any suitable combination or sub-combination thereof. In one embodiment, the second layer 104 includes a non-woven layer 108, a decorative layer 110, and a wear layer 112.

The non-woven layer 108 includes a non-woven material, such as a scrim, as a base to build up the layer. In one embodiment, the non-woven layer 108 has thickness between about 10 mils and about 30 mils, between about 10 mils and about 20 mils, between about 20 mils and about 30 mils, between about 10 mils and about 15 mils, between about 15 mils and about 20 mils, or any suitable combination or sub-combination thereof. In one embodiment, the non-woven layer 108 is resistant to softening up to a predetermined temperature (for example, 420° F.). The non-woven material includes one or both of glass and polyester, which is then saturated with plastisol (a suspension of polyvinyl chloride particles in a plasticizer), for example, by being processed on large heated rolls with the plastisol coating and filling voids in a grid of the non-woven material. The plastisol further secures the second layer 104 to the first layer 102. In one embodiment, the non-woven layer 108 includes an intermediate layer (not shown) on one or both of the top and the bottom surface. The intermediate layer includes a gel coating, a tacky outer surface of the plastisol coating that is partially-cured or partially-solidified, a foam coating, or any suitable combination thereof.

In one embodiment, the decorative layer 110 includes a printable plastisol layer 114. In one embodiment, the printable plastisol layer 114 has a predetermined thickness, for example, between about 4 mils and 40 mils, between about 10 mils and about 20 mils, between about 20 mils and about 30 mils, between about 7 mils and about 11 mils, or any suitable combination or sub-combination thereof. In one embodiment, the printable plastisol layer 114 is applied as a coating to the non-woven layer 108, then a pigment or ink coating layer 116 is applied onto the printable plastisol layer 114 and/or is rendered a solid or gelled by intermediate heat treatment (for example, between about 250° F. and about 300° F.). In further embodiments, the printable plastisol layer 114 includes a white base or other pigmentation. Alternatively, the printable plastisol layer 114 includes the intermediate layer. In one embodiment, the ink coating layer 116 includes pigments or other printing on film or other suitable material applied to the printable plastisol layer 114 by, for example, rotogravure printing. In one embodiment, the ink coating layer 116 has a predetermined thickness, for example, between about 0.1 mils and about 0.5 mils, between about 0.3 mils and about 0.5 mils, between about 0.1 mils and 0.3 mils, less than 0.5 mils, or any suitable combination or sub-combination thereof.

In one embodiment, the wear layer 112 includes a plastisol clearcoat layer 118 and a coating wear layer 120. In one embodiment, the plastisol clearcoat layer 118 has a predetermined thickness, for example, between about 0.1 mils and about 40 mils, between about 10 mils and about 40 mils, between about 10 mils and about 20 mils, between about 20 mils and about 30 mils, less than about 40 mils, less than about 20 mils, or any suitable combination or sub-combination thereof. In one embodiment, the coating wear layer 120 has a predetermined thickness, for example, between about 0.1 mils and about 5 mils, between about 1 mil and about 5 mils, between about 3 mils and about 5 mils, between about 0.1 mils and about 0.5 mils, less than about 5 mils, less than about 1 mil, less than about 0.5 mils, about 0.5 mils, or any suitable combination or sub-combination thereof. The plastisol clearcoat layer 118 is applied to the ink layer 116. After the plastisol clearcoat layer 118 is allowed to cool and expand, the coating wear layer 120 is applied onto it. The coating wear layer 120 is a polymeric film, such as a radiation-curable coating, a thermally-curable coating, or other suitable material. The coating is radiation-cured, for example, by use of electron beam or ultra-violet light, or combination thereof. In one embodiment, after the coating wear layer 120 is applied and cured, the product 100 is further cooled, and then press diecut into planks, tiles, or any other suitable product.

Figure 2:
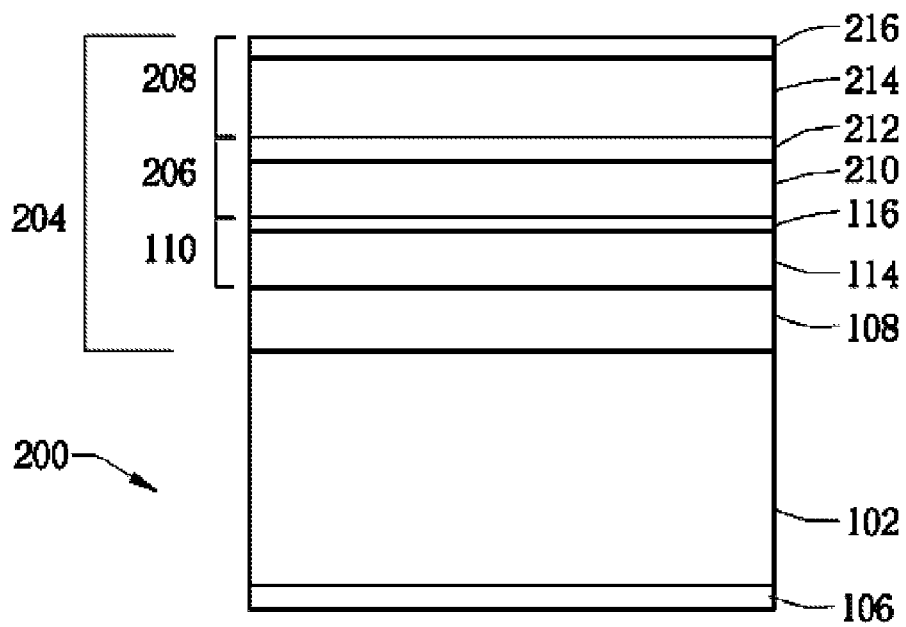
FIG. 2 illustrates an exemplary product having a flexible layer and a rigid layer according to an embodiment of the disclosure.

Referring to FIG. 2, in one embodiment, a product 200 similar to the product 100 of FIG. 1 includes the first layer 102 and a second layer 204 heat-adhered to the first layer 102. In one embodiment, the second layer 204 includes the non-woven layer 108, the decorative layer 110, a protective layer 206, and a wear layer 208. The protective layer 206 includes a plastisol clearcoat layer 210 applied to the ink coating layer 116, with a coating wear layer 212 applied on the plastisol clearcoat layer 210 (the coating wear layer 212 having been applied after the plastisol clearcoat layer 210 was allowed to cool and expand). In one embodiment, the plastisol clearcoat layer 210 includes the intermediate layer (not shown) on one or both of the top and the bottom surface. In one embodiment, decorative layer 110 is devoid of the pigment or ink coating layer 116, and additionally or alternatively, a clear film 214 includes printing.

In one embodiment, the coating wear layer 212 is a radiation-curable coating. The coating wear layer 212 includes the clear film 214 and a surface coating 216. The surface coating 216 is a radiation-curable coating or other suitable material. In one embodiment, after the surface coating 216 is applied and cured, the product 200 is further cooled, and then press diecut into planks or tiles or any other suitable product.

Referring to FIG. 3, in one embodiment, a process 300 of fabricating a product (for example, the product 100 of FIG. 1 or the product 200 of FIG. 2) or a portion of the product (for example, the second layer 104) includes preparing the non-woven material (step 302), for example, by unwinding a flexible roll of the non-woven material. The process 300 then includes saturating the non-woven material to form the non-woven layer (step 304), for example, by rendering it a solid or gelling with plastisol. Next, the process 300 includes forming the intermediate layer on or in the non-woven layer (step 306) and applying and curing one or more of the coatings and/or layers described above (step 308), thereby forming the second layer (step 310). In a further embodiment, the process 300 includes positioning the second layer on the first layer (step 312) and heat adhering the second layer to the first layer (step 314) to form the product. As will be appreciated, the process 300 includes any other suitable steps for forming the features described above.

Referring to FIG. 4, in one embodiment, a process 400 of fabricating a product (for example, the product 100 of FIG. 1 or the product 200 of FIG. 2) or a portion of the product (for example, the first layer 104) includes blending, milling, and/or melt-processing a composition (for example, the vinyl composition) to form the first layer (step 402). The process 400 continues by heating the first layer (step 404). In a further embodiment, the process 400 further includes positioning the first layer to receive the second layer (step 404) and heat adhering the second layer to the first layer (step 406). As will be appreciated, the process 400 includes any other suitable steps for forming the features described above. In one embodiment, the process 400 described with reference to FIG. 4 and the process 300 described with reference to FIG. 3 are combined to form the product 100 having the first layer 102 and the second layer 104.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A laminate flooring product, the product comprising:
   a first layer that is melt-processed and having a first major surface opposite a second major surface, the first layer comprising plasticizer in an amount ranging from about 4 wt. % to 10 wt. % based on the total weight of the first layer; and
   a second layer that is heat-adhered to the first layer, the second layer comprising the following sub-layers:
   a wear layer;
   a decorative layer;
   a non-woven intermediate layer impregnated with a plastisol coating; and
   wherein the second layer has greater flexibility than the first layer, and wherein the wear layer is adjacent to the decorative layer, the decorative layer is adjacent to the non-woven intermediate layer, and the plastisol coating is in surface contact with the first major surface of the first layer.

2. The laminate flooring product of claim 1, further comprising a bottom layer that is secured to the first layer by lamination or by an adhesive, the bottom layer being opposite the second layer and the bottom layer includes at least one of vinyl polymer, polyester, polyolefin, nylon, or a combination thereof.

3. The laminate flooring product of claim 1, wherein the first layer includes less than about 17.5% of binder.

4. The laminate flooring product of claim 1, wherein the dimensional stability is capable of being exhibited by a predetermined dimensional stability shrinkage, the predetermined dimensional stability shrinkage being less than about 0.3%.

5. The laminate flooring product of claim 1, wherein the first layer includes a bottom layer adhered by adhesive.

6. The laminate flooring product of claim 1, wherein the second layer has a thickness of less than 60 mils.

7. The laminate flooring product of claim 1, wherein the non-woven layer includes one or both of glass and polyester.

8. The laminate flooring product of claim 1, wherein the second layer includes a printable plastisol layer.

9. The laminate flooring product of claim 1, wherein the decorative layer includes a pigment or ink coating layer.

10. The laminate flooring product of claim 1, wherein the second layer includes a plastisol clearcoat layer.

11. The laminate flooring product of claim 1, wherein the dimensional stability is capable of being exhibited by a predetermined dimensional stability shrinkage, the predetermined dimensional stability shrinkage being less than about 0.1%.

12. The laminate flooring product of claim 1, wherein the first layer has a thickness ranging from 70 mils to 150 mils.

13. The laminate flooring product of claim 1, wherein the first layer includes a vinyl composition.

14. The laminate flooring product of claim 13 wherein the vinyl composition includes one or more stabilizers, one or more binders, and one or more fillers.

* * * * *